(12) United States Patent
Iketomi et al.

(10) Patent No.: US 11,597,371 B2
(45) Date of Patent: Mar. 7, 2023

(54) CONTROLLER AND CONTROL METHOD FOR VEHICLE

(71) Applicant: TOYOTA JIDOSHA KABUSHIKI KAISHA, Toyota (JP)

(72) Inventors: Kazuhiro Iketomi, Nagoya (JP); Yasutaka Tsuchida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 176 days.

(21) Appl. No.: 17/168,612

(22) Filed: Feb. 5, 2021

(65) Prior Publication Data

US 2021/0300319 A1  Sep. 30, 2021

(30) Foreign Application Priority Data

Mar. 27, 2020 (JP) .............................. JP2020-057696

(51) Int. Cl.
*B60W 10/26* (2006.01)
*B60W 20/00* (2016.01)
(Continued)

(52) U.S. Cl.
CPC .............. *B60W 20/00* (2013.01); *B60K 6/26* (2013.01); *B60W 30/192* (2013.01); *F01N 3/021* (2013.01); *F02D 41/062* (2013.01); *F02D 41/068* (2013.01); *H02J 7/0048* (2020.01); *H02J 7/007194* (2020.01); *H02J 7/16* (2013.01); *B60K 6/24* (2013.01); (Continued)

(58) Field of Classification Search
CPC ...... B60W 10/08; B60W 10/06; B60W 20/00; B60W 30/192; H02J 7/007194; H02J 7/0048; H02J 7/16; B60K 6/26; F01N 3/021; F02D 41/062; F02D 41/068
See application file for complete search history.

(56) References Cited

U.S. PATENT DOCUMENTS

2007/0204594 A1*  9/2007  Ishii ..................... B60W 10/26
                                                            60/299
2007/0204601 A1   9/2007  Ishii et al.
(Continued)

FOREIGN PATENT DOCUMENTS

JP         2007-230476 A       9/2007
JP         2014-144659 A       8/2014
JP    WO2019116586 A1 *      12/2017  ............ B60W 10/08

*Primary Examiner* — Gonzalo Laguarda
(74) *Attorney, Agent, or Firm* — Finnegan, Henderson, Farabow, Garrett & Dunner, LLP (57) ABSTRACT

A controller for a vehicle is configured to execute, when a state of charge of a battery is less than or equal to a threshold, a charging control to charge the battery with power that is generated by a motor generator using driving force of an internal combustion engine. The controller is also configured to obtain a temperature of the battery, set the threshold to a first threshold during a warm-up period, which is a period from a start of the internal combustion engine until the warm-up of the internal combustion engine is completed, set the threshold to a second threshold, which is greater than the first threshold, when the warm-up period ends, and set the second threshold to be greater when the temperature of the battery is a first temperature than when the temperature of the battery is a second temperature, which is higher than the first temperature.

4 Claims, 4 Drawing Sheets

(51) Int. Cl.
- *B60W 30/192* (2012.01)
- *B60K 6/26* (2007.10)
- *F02D 41/06* (2006.01)
- *F01N 3/021* (2006.01)
- *H02J 7/00* (2006.01)
- *H02J 7/16* (2006.01)
- *B60K 6/24* (2007.10)

(52) U.S. Cl.
CPC . *B60W 2510/244* (2013.01); *B60W 2510/246* (2013.01); *B60Y 2200/92* (2013.01); *B60Y 2300/91* (2013.01)

(56) References Cited

U.S. PATENT DOCUMENTS

| | | | |
|---|---|---|---|
| 2020/0101964 A1* | 4/2020 | Badger | B60W 20/13 |
| 2021/0155218 A1* | 5/2021 | Higuchi | B60L 58/13 |
| 2022/0219675 A1* | 7/2022 | Miura | F02D 41/0087 |

* cited by examiner

CONTROLLER AND CONTROL METHOD FOR VEHICLE

BACKGROUND

1. Field

The present disclosure relates to a controller and a control method for a vehicle.

2. Description of Related Art

Japanese Laid-Open Patent Publication No. 2007-230476 discloses a vehicle equipped with an internal combustion engine and a motor generator as drive sources of the vehicle. The vehicle includes a battery that stores power. The stored power is generated by the motor generator using driving force of the internal combustion engine.

Since the temperature of the internal combustion engine is relatively low during a period from the start of the internal combustion engine until warm-up is completed, the amount of particulate matter discharged from the internal combustion engine is relatively large. Particularly, if the amount of power that the battery can supply to the motor generator is small, the ratio of the output of the internal combustion engine to the vehicle required output, which is necessary for the vehicle to travel, increases. This further increases the amount of particulate matter discharged from the internal combustion engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a controller for a vehicle is provided. The vehicle includes an internal combustion engine, a motor generator, and a battery that is configured to store power that is generated by the motor generator using a driving force of the internal combustion engine. The controller includes circuitry configured to execute, when a state of charge of the battery is less than or equal to a threshold, a charging control to charge the battery with the power that is generated by the motor generator using the driving force of the internal combustion engine. The circuitry is configured to obtain a temperature of the battery, set the threshold to a first threshold during a warm-up period, the warm-up period being a period from a start of the internal combustion engine until the warm-up of the internal combustion engine is completed, set the threshold to a second threshold when the warm-up period ends, the second threshold being greater than the first threshold, and set the second threshold to be greater when the temperature of the battery is a first temperature than when the temperature of the battery is a second temperature, the second temperature being higher than the first temperature.

In another general aspect, a control method for a vehicle is provided. The vehicle includes an internal combustion engine, a motor generator, and a battery that is configured to store power that is generated by the motor generator using a driving force of the internal combustion engine. The control method includes: executing, when a state of charge of the battery is less than or equal to a threshold, a charging control to charge the battery with the power that is generated by the motor generator using the driving force of the internal combustion engine; obtaining a temperature of the battery; setting the threshold to a first threshold during a warm-up period, the warm-up period being a period from a start of the internal combustion engine until the warm-up of the internal combustion engine is completed; setting the threshold to a second threshold when the warm-up period ends, the second threshold being greater than the first threshold; and setting the second threshold to be greater when the temperature of the battery is a first temperature than when the temperature of the battery is a second temperature, the second temperature being higher than the first temperature.

When the charging control is executed, the ratio of the output of the internal combustion engine to the vehicle required output, which is necessary for the vehicle to travel, increases as compared to a case in which the charging control is not performed. This increases the amount of particulate matter discharged from the internal combustion engine. In this regard, since the first threshold is lower than the second threshold in the above-described configuration, the charging control is less likely to be executed during the warm-up period of the internal combustion engine than after the warm-up period of the internal combustion engine has ended.

When the temperature of the battery is low, the amount of power that the battery can supply to the motor generator is small as compared to a case in which the battery temperature is high. Accordingly, the state of charge of the battery is calculated to be lower when the battery temperature is low than when the battery temperature is high. The charging control is executed if the state of charge of the battery is less than or equal to the first threshold during a warm-up period of the internal combustion engine. In this regard, the second threshold of the above-described configuration is increased to be higher when the battery temperature is low than when the battery temperature is high. Thus, the state of charge of the battery is unlikely to fall to or below the first threshold in a subsequent warm-up period of the internal combustion engine. This limits an increase in the ratio of the output of the internal combustion engine to the vehicle required output, which is necessary for the vehicle to travel, due to the execution of the charging control during a warm-up period of the internal combustion engine. The configuration is therefore capable of limiting an increase in the amount of particulate matter discharged from the internal combustion engine during the warm-up period of the internal combustion engine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of the present disclosure will now be described with reference to FIGS. 1 to 5. First, a schematic configuration of a vehicle 100 will be described.

Figure 1:
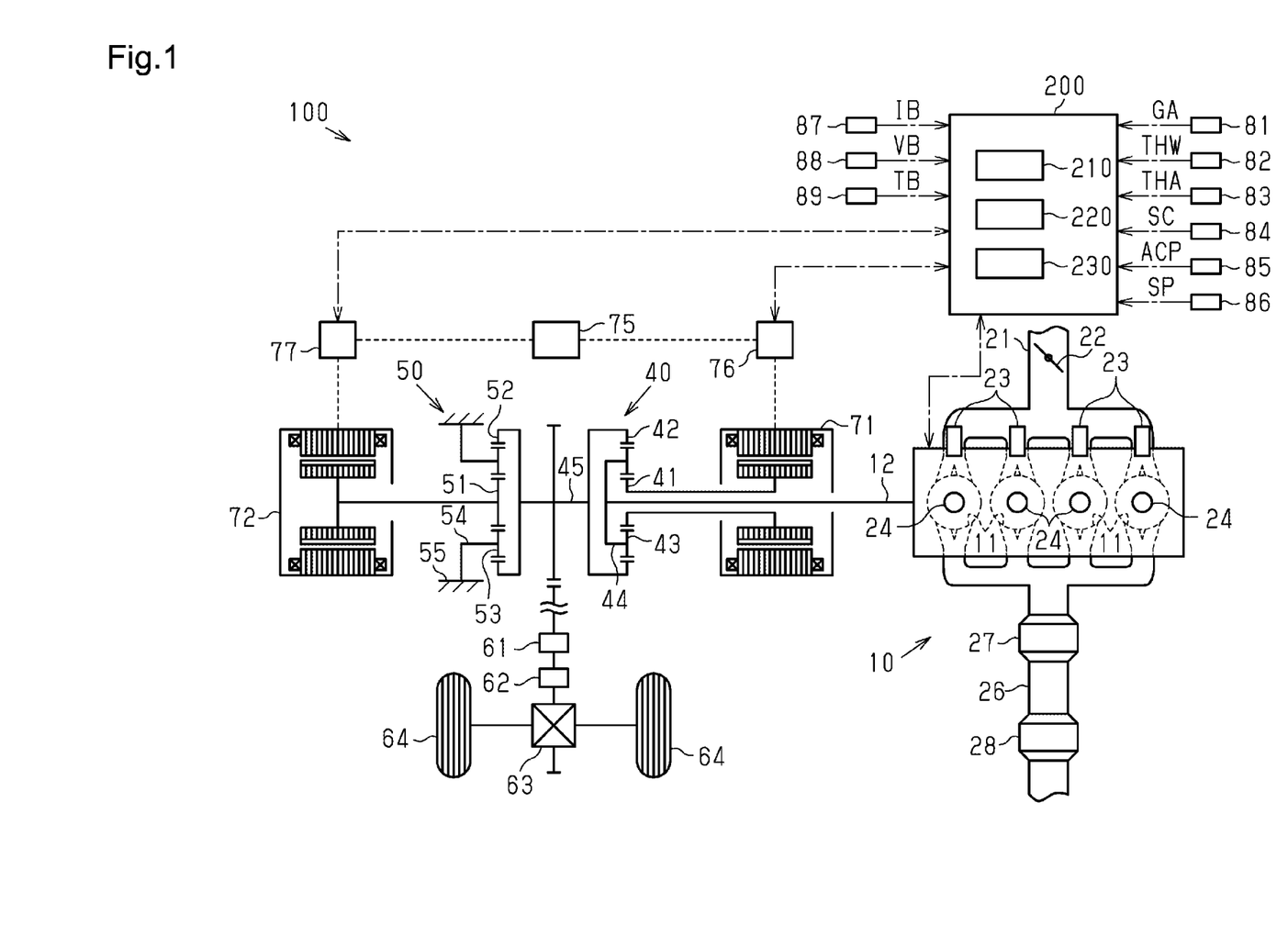
FIG. 1 is a schematic diagram showing a configuration of a vehicle.

As shown in FIG. 1, the vehicle 100 includes an internal combustion engine 10 of a spark-ignition type. The vehicle 100 also has two motor generators, that is, a first motor generator 71 and a second motor generator 72, each of which functions as both an electric motor and a generator. Thus, the vehicle 100 is a hybrid vehicle, which includes two types of drive sources: the internal combustion engine 10 and the motor generators 71, 72.

The internal combustion engine 10 includes cylinders 11, a crankshaft 12, an intake passage 21, a throttle valve 22, fuel injection valves 23, ignition devices 24, an exhaust passage 26, a three-way catalyst 27, and a filter 28.

Mixture of fuel and intake air is burned in each cylinder 11. The internal combustion engine 10 includes four cylinders 11. The intake passage 21 is connected to the cylinders 11. The intake passage 21 is divided into four branches on the downstream side, and the four branches are respectively connected to the corresponding cylinders 11. The intake passage 21 introduces intake air to the cylinders 11 from outside the internal combustion engine 10.

The throttle valve 22 is arranged on the upstream side of the branches of the intake passage 21. The throttle valve 22 regulates the amount of intake air that flows through the intake passage 21.

The fuel injection valves 23 are respectively arranged in the four branches of the intake passage 21. The internal combustion engine 10 includes four fuel injection valves 23 in correspondence with the four cylinders 11. The fuel injection valves 23 inject fuel supplied from a fuel tank (not shown) into the intake passage 21. The ignition devices 24 respectively arranged in the cylinders 11. That is, the internal combustion engine 10 includes four ignition devices 24. The ignition devices 24 ignite a mixture of fuel and intake air by spark discharge.

The exhaust passage 26 is connected to the cylinders 11. The exhaust passage 26 is divided into four branches on the upstream side, and the four branches are respectively connected to the corresponding cylinders 11. The exhaust passage 26 discharges exhaust gas from the cylinders 11 to the outside of the internal combustion engine 10.

The three-way catalyst 27 is arranged on the downstream side of the branches of the exhaust passage 26. The three-way catalyst 27 purifies exhaust gas flowing through the exhaust passage 26. The filter 28 is arranged on the downstream side of the three-way catalyst 27 in the exhaust passage 26. The filter 28 traps particulate matter that is in the exhaust gas flowing through the exhaust passage 26.

The crankshaft 12 is coupled to pistons (not shown) accommodated in the cylinders 11. The crankshaft 12 is rotated by combustion of air-fuel mixture in the cylinders 11.

The vehicle 100 includes a battery 75, a first inverter 76, and a second inverter 77. When the first motor generator 71 and the second motor generator 72 function as generators, the battery 75 stores power generated by the first motor generator 71 and the second motor generator 72. When the first motor generator 71 and the second motor generator 72 function as electric motors, the battery 75 supplies power to the first motor generator 71 and the second motor generator 72.

The first inverter 76 regulates the amount of power transferred between the first motor generator 71 and the battery 75. The second inverter 77 regulates the amount of power transferred between the second motor generator 72 and the battery 75.

The vehicle 100 includes a first planetary gear mechanism 40, a ring gear shaft 45, a second planetary gear mechanism 50, an automatic transmission 61, a speed reduction mechanism 62, a differential mechanism 63, and drive wheels 64.

The first planetary gear mechanism 40 includes a sun gear 41, a ring gear 42, pinion gears 43, and a carrier 44. The sun gear 41 is an external gear. The sun gear 41 is connected to the first motor generator 71. The ring gear 42 is an internal gear and is coaxially arranged with the sun gear 41. The pinion gears 43 are arranged between the sun gear 41 and the ring gear 42. Each pinion gear 43 meshes with both the sun gear 41 and the ring gear 42. The carrier 44 supports the pinion gears 43, while allowing the pinion gears 43 to orbit and rotate. The carrier 44 is connected to the crankshaft 12.

The ring gear shaft 45 is connected to the ring gear 42. The automatic transmission 61 is connected to the ring gear shaft 45. The automatic transmission 61 is coupled to the drive wheels 64 via the speed reduction mechanism 62 and the differential mechanism 63. The automatic transmission 61 is of a multi-speed type having multiple planetary gear mechanisms. The automatic transmission 61 changes the gear position, thereby switching the gear ratio.

The second planetary gear mechanism 50 includes a sun gear 51, a ring gear 52, pinion gears 53, a carrier 54, and a case 55. The sun gear 51 is an external gear. The sun gear 51 is connected to the second motor generator 72. The ring gear 52 is an internal gear and is coaxially arranged with the sun gear 51. The ring gear 52 is connected to the ring gear shaft 45. The pinion gears 53 are arranged between the sun gear 51 and the ring gear 52. Each pinion gear 53 meshes with both the sun gear 51 and the ring gear 52. The carrier 54 supports the pinion gears 53, while allowing the pinion gears 53 to rotate. The carrier 54 is fixed to the case 55. The pinion gears 53 are thus unable to orbit.

The vehicle 100 includes an air flow meter 81, a coolant temperature sensor 82, an intake air temperature sensor 83, a crank angle sensor 84, an accelerator position sensor 85, a vehicle speed sensor 86, a current sensor 87, a voltage sensor 88, and a temperature sensor 89.

The air flow meter 81 detects an intake air amount GA, which is the amount of intake air that flows through the intake passage 21 per unit time. The coolant temperature sensor 82 detects a coolant temperature THW, which is the temperature of coolant flowing through various parts of the internal combustion engine 10. The intake air temperature sensor 83 detects an intake air temperature THA, which is the temperature of intake air that flows through the intake passage 21. The crank angle sensor 84 detects a crank angle SC, which is a rotational angle of the crankshaft 12. The accelerator position sensor 85 detects an accelerator operation amount ACP, which is the depressed amount of the accelerator pedal by the driver. The vehicle speed sensor 86 detects a vehicle speed SP, which is the speed of the vehicle 100. The current sensor 87 detects a current IB, which is supplied to or outputted from the battery 75. The voltage sensor 88 detects a voltage VB, which is the terminal-to-terminal voltage of the battery 75. The temperature sensor 89 detects a battery temperature TB, which is the temperature of the battery 75.

The vehicle 100 includes a controller 200. The controller 200 receives a signal indicating the intake air amount GA from the air flow meter 81. The controller 200 receives a signal indicating the coolant temperature THW from the coolant temperature sensor 82. The controller 200 receives a signal indicating the intake air temperature THA from the intake air temperature sensor 83. The controller 200 receives a signal indicating the crank angle SC from the crank angle sensor 84. The controller 200 receives a signal indicating the accelerator operation amount ACP from the accelerator position sensor 85. The controller 200 receives a signal indicating the vehicle speed SP from the vehicle speed sensor 86. The controller 200 receives a signal indicating the current IB from the current sensor 87. The controller 200 receives a signal indicating the voltage VB from the voltage sensor 88. The controller 200 receives a signal indicating the battery temperature TB from the temperature sensor 89.

The controller 200 calculates an engine rotation speed NE, which is the number of revolutions per unit time of the crankshaft 12, on the basis of the crank angle SC. The controller 200 calculates an engine load factor KL on the basis of the engine rotation speed NE and the intake air amount GA. The engine load factor KL is the ratio of the current cylinder inflow air amount to a cylinder inflow air amount that would be achieved if the internal combustion engine 10 operated at the current engine rotation speed NE in a steady operational state with the throttle valve 22 fully open. The cylinder inflow air amount is the amount of air that flows into each cylinder 11 during the intake stroke.

The controller 200 calculates a catalyst temperature TSC, which is the temperature of the three-way catalyst 27, on the basis of the operating state of the internal combustion engine 10, such as the intake charging efficiency and the engine rotation speed NE. The controller 200 calculates a filter temperature TF, which is the temperature of the filter 28, on the basis of the operating state of the internal combustion engine 10, such as the intake charging efficiency and the engine rotation speed NE. The controller 200 calculates a particulate matter (PM) deposit amount PS, which is the deposit amount of particulate matter of the filter 28, on the basis of the engine rotation speed NE, the engine load factor KL, and the filter temperature TF.

When the PM deposit amount PS reaches a regeneration preset value, and regeneration is required, the controller 200 executes a regeneration control that increases the temperature of the filter 28 to burn particulate matter in the filter 28, thereby reducing the particulate matter in the filter 28. The execution of the regeneration control prevents the filter 28 from being at least partially clogged with particulate matter.

The controller 200 includes a control unit 210, an obtaining unit 220, and a setting unit 230. The control unit 210 controls the internal combustion engine 10, the first motor generator 71, and the second motor generator 72 according to the state of the vehicle 100. The details of the control executed by the control unit 210 will be described below.

The obtaining unit 220 obtains the current TB, the voltage VB, and the battery temperature TB. The obtaining unit 220 calculates a state of charge SOC of the battery 75 on the basis of the current TB, the voltage VB, and the battery temperature TB. The state of charge SOC, which is calculated by the obtaining unit 220, increases as the current TB supplied to the battery 75 increases in relation to the current TB output from the battery 75. The state of charge SOC increases as the voltage VB increases, and decreases as the battery temperature TB decreases.

The state of charge SOC is represented by the following expression 1.

$$\text{State of charge SOC [\%]} = \text{Remaining power of battery [Ah]/Full charge capacity of battery [Ah]} \times 100[\%]. \qquad \text{Expression 1:}$$

The control unit 210 executes a charging control for the battery 75 such that the state of charge SOC of the battery 75 falls inside a range between a state-of-charge upper limit SUCH and a state-of-charge lower limit SOCL. The charging control will be described below. The state-of-charge upper limit SOCH is, for example, 60%, and is set by the setting unit 230 in accordance with the operating state of the internal combustion engine 10. The obtaining unit 220 stores the obtained battery temperature TB for a specific period of time.

The setting unit 230 selectively sets the state-of-charge lower limit SOCL to a first lower limit A or a second lower limit B. The first lower limit A is a value of the state-of-charge lower limit SOCL that is used during a warm-up period, which is the period from the start of the internal combustion engine 10 until the warm-up of the internal combustion engine 10 is completed. The initial value of the first lower limit A is, for example, 30%. A specific example of the warm-up period of the internal combustion engine 10 is a period from when combustion of air-fuel mixture is started in the cylinders 11 until when the catalyst temperature TSC reaches a preset temperature necessary to purify the exhaust gas in the three-way catalyst 27. The second lower limit B is a value of the state-of-charge lower limit SOCL that is used when the internal combustion engine 10 completes the warm-up. The initial value of the second lower limit B is set to a value greater than the initial value of the first lower limit A, and, for example, is 40%. The first lower limit A corresponds to a first threshold. The second lower limit B corresponds to a second threshold.

In the present embodiment, the setting unit 230 sets the state-of-charge lower limit SOCL to a value equal to the initial value of the first lower limit A during periods other than the period from the start of the internal combustion engine 10 until the operation of the internal combustion engine 10 ends.

Control of the vehicle 100 executed by the control unit 210 will now be described.

On the basis the accelerator operation amount ACP and the vehicle speed SP, the control unit 210 calculates a vehicle required output, which is a required value of the output necessary for the vehicle 100 to travel. The control unit 210 determines the torque distribution of the internal combustion engine 10, the first motor generator 71, and the second motor generator 72 according to the vehicle required output and the state of charge SOC. On the basis of the torque distribution of the internal combustion engine 10, the first motor generator 71, and the second motor generator 72, the control unit 210 controls the output of the internal combustion engine 10 and the powering operation/regenerative operation performed by the first motor generator 71 and the second motor generator 72.

When the vehicle 100 travels, the control unit 210 selects one of an EV mode and an HV mode as the traveling mode of the vehicle 100. The EV mode causes the vehicle 100 to travel using the driving force of the first motor generator 71 and/or the second motor generator 72, without driving the internal combustion engine 10. The HV mode drives the vehicle 100 using the driving force of the internal combustion engine 10 in addition to the driving force of the first motor generator 71 and/or the second motor generator 72.

When the state of charge SOC is greater than the state-of-charge lower limit SOCL, that is, when the remaining power of the battery 75 is sufficient, the control unit 210 selects the EV mode for the starting and traveling under light load of the vehicle 100.

When the state of charge SOC is less than or equal to the state-of-charge lower limit SOCL, the control unit 210 selects the HV mode. In this case, the control unit 210 drives the internal combustion engine 10 in order to drive the first motor generator 71 using the driving force of the internal combustion engine 10, thereby generating power. The control unit 210 executes the charging control that charges the battery 75 with the power generated by the first motor generator 71. The control unit 210 causes the vehicle 100 to travel using some of the driving force of the internal combustion engine 10 and the driving force of the second motor generator 72.

Even when the state of charge SOC is greater than the state-of-charge lower limit SOCL, the control unit 210 selects the HV mode in the following cases. The control unit 210 selects the HV mode, for example, when the vehicle speed SP is an upper speed limit of the EV mode, when high-load traveling of the vehicle 100 is required, when quick acceleration of the vehicle 100 is required, or when the internal combustion engine 10 needs to be started. When starting the internal combustion engine 10, the control unit 210 rotates the crankshaft 12 using the driving force of the first motor generator 71, thereby starting the internal combustion engine 10.

When deceleration of the vehicle 100 is required, the control unit 210 stops the internal combustion engine 10. Then, the control unit 210 causes the second motor generator 72 to function as a generator, and charges the battery 75 with the power generated by the second motor generator 72.

Also, when the vehicle 100 is in a stopped state, the control unit 210 switches the control of the vehicle 100 in accordance with the state of charge SOC. Specifically, when the state of charge SOC is greater than the state-of-charge lower limit SOCL, the control unit 210 does not drive the internal combustion engine 10, the first motor generator 71, or the second motor generator 72. In contrast, when the state of charge SOC is less than the state-of-charge lower limit SOCL, the control unit 210 drives the internal combustion engine 10 and uses the driving force of the internal combustion engine 10 to drive the first motor generator 71, thereby generating power. The control unit 210 executes the charging control that charges the battery 75 with the power generated by the first motor generator 71.

When warm-up of the internal combustion engine 10 is required, the control unit 210 selects the HV mode. Until the warm-up of the internal combustion engine 10 is completed, the control unit 210 continues to select the HV mode, and continues to drive the internal combustion engine 10 to complete the warm-up of the internal combustion engine 10.

The controller 200 may include circuitry including one or more processors that perform various processes according to computer programs (software). Further, the controller 200 may include circuitry including one or more dedicated hardware circuits such as application specific integrated circuits (ASIC) that execute at least part of the various processes, or circuitry including a combination of the one or more processors and the one or more dedicated hardware circuits. The processor includes a CPU and memory such as a RAM, a ROM, and the like. The memory stores program codes or instructions configured to cause the CPU to execute processes. The memory, which is computer-readable medium, includes any type of media that are accessible by general-purpose computers and dedicated computers.

A normal-time value setting control for the state-of-charge lower limit SOCL executed by the controller 200 will now be described with reference to FIG. 2. The controller 200 repeatedly executes the normal-time value setting control when the internal combustion engine 10 is not in the warm-up period during a period from the start of the internal combustion engine 10 until the end of the operation of the internal combustion engine 10.

Figure 2:
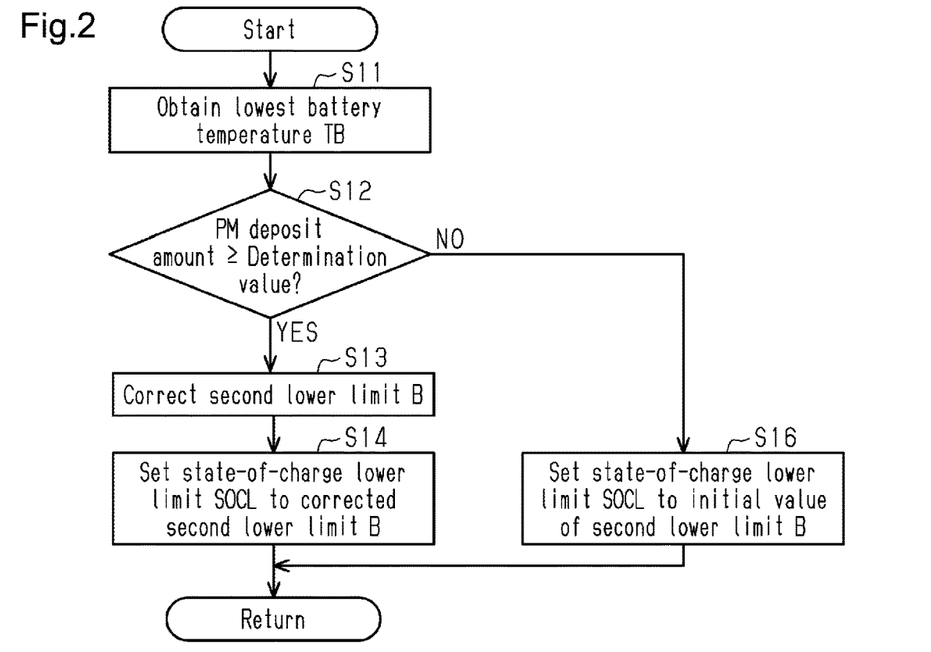
FIG. 2 is a flowchart showing a normal-time value setting control for a state-of-charge lower limit.

When starting the normal-time value setting control, the controller 200 executes the process of step S11 as shown in FIG. 2. In step S11, the setting unit 230 obtains the lowest battery temperature TB among the battery temperatures TB obtained by the obtaining unit 220 in the current trip. The 'trip' refers to a period from when an operation of the controller 200 is started by pressing a start switch until the operation of the controller 200 is ended by a subsequent pressing of the start switch. Thereafter, the setting unit 230 advances the process to step S12.

In step S12, the setting unit 230 determines whether the PM deposit amount PS is greater than or equal to a predetermined determination value. The determination value is set to be less than the regeneration preset value, at which regeneration of the filter 28 is required, by a specific amount. When the PM deposit amount PS is greater than or equal to the determination value, the PM deposit amount PS of the filter 28 is greater than that in a case in which the PM deposit amount PS is less than the determination value. In this case, the filter 28 is likely to be at least partially clogged with particulate matter. When determining that the PM deposit amount PS is greater than or equal to the predetermined determination value in step S12 (S12: YES), the setting unit 230 advances the process to step S13. In contrast, when determining that the PM deposit amount PS is less than the predetermined determination value in step S12 (S12: NO), the setting unit 230 advances the process to step S16.

In step S16, the setting unit 230 sets the state-of-charge lower limit SOCL to the initial value (specific value) of the second lower limit B. Thereafter, the setting unit 230 ends the current normal-time value setting control.

As described above, when determining that the PM deposit amount PS is greater than or equal to the predetermined determination value in step S12 (S12: YES), the setting unit 230 advances the process to step S13.

In step S13, the setting unit 230 corrects the second lower limit B on the basis of the lowest battery temperature TB obtained in step S11. For example, if the battery temperature TB at the point in time of the process of S13 is higher than the lowest battery temperature TB obtained in step S11 the battery temperature TB may decrease thereafter to a value lower than the lowest battery temperature TB obtained in step S11. When the battery temperature TB decreases, the state of charge SOC of the battery 75, which is calculated at that time, is low. Thus, in anticipation of a subsequent reduction of the state of charge SOC of the battery 75, it is effective to increase the current state of charge SOC of the battery 75 by increasing the state-of-charge lower limit SOCL. The setting unit 230 stores a setting map, in which the battery temperature TB and the second lower limit B are associated with each other. The setting map can be acquired, for example, through experiments in advance. By referring to the setting map, the setting unit 230 calculates a corrected second lower limit B on the basis of the lowest battery temperature TB obtained in step S11. The corrected second lower limit B, which is calculated by the setting unit 230, is greater than the initial value of the second lower limit B. That is, the corrected second lower limit B is obtained by correcting the initial value of the second lower limit B such that the second lower limit B is greater than the initial value. Also, the corrected second lower limit B, which is calculated by the setting unit 230, increases as the lowest battery temperature TB obtained in step S11 decreases. Thereafter, the setting unit 230 advances the process to step S14.

In step S14, the setting unit 230 sets the state-of-charge lower limit SOCL to the corrected second lower limit B. That is, the state-of-charge lower limit SOCL set in step S14 is greater than the state-of-charge lower limit SOCL set in step S16. Thereafter, the setting unit 230 ends the current normal-time value setting control.

A warm-up-time value setting control for the state-of-charge lower limit SOCL executed by the controller 200 will now be described with reference to FIG. 3. The controller 200 repeatedly executes the warm-up-time value setting control during a warm-up period of the internal combustion engine 10.

Figure 3:
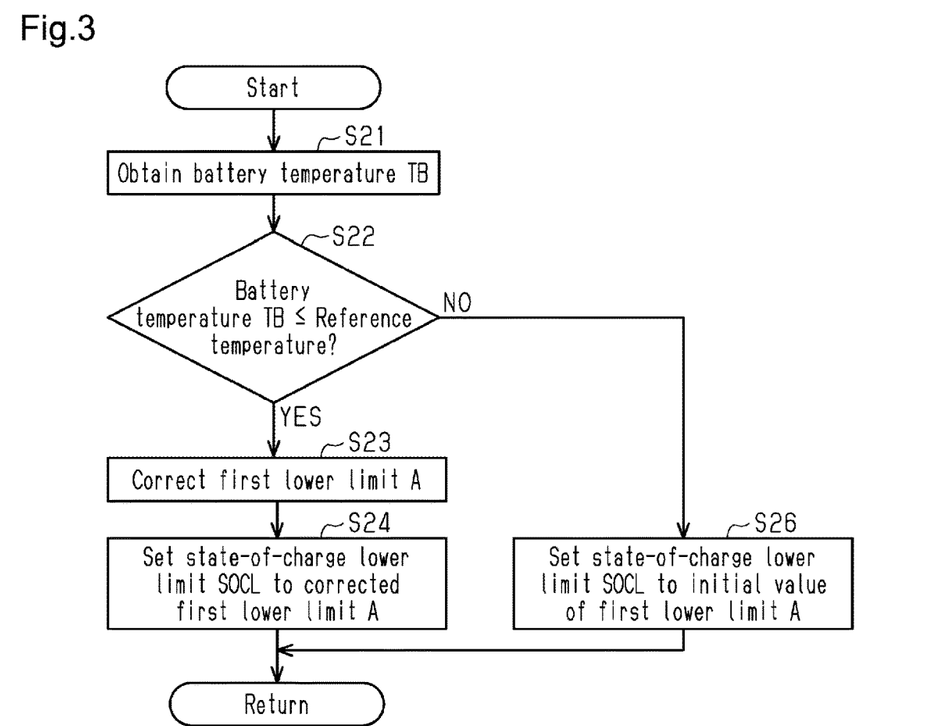
FIG. 3 is a flowchart showing a warm-up-time value setting control for the state-of-charge lower limit.

When starting the warm-up-time value setting control, the controller 200 executes the process of step S21 as shown in FIG. 3. In step S21, the setting unit 230 obtains the battery temperature TB at the point in time of the process of step S21 among the battery temperatures TB obtained by the obtaining unit 220. Thereafter, the setting unit 230 advances the process to step S22.

At step S22, the setting unit 230 determines whether the battery temperature TB obtained in step S21 is lower than or equal to a predetermined reference temperature. As the battery temperature TB obtained in step S21 decreases, the state of charge SOC of the battery 75 calculated at that point in time decreases. When the state of charge SOC of the battery 75 decreases, it is likely that the state of charge SOC of the battery 75 will fall to or below the state-of-charge lower limit SOCL, so that the charging control is be executed. Thus, the reference temperature is set to a value for determining whether the current battery temperature TB is likely to drop so that the charging control is executed. The reference temperature is, for example, 0° C. When determining that the battery temperature TB is lower than or equal to the predetermined reference temperature at step S22 (S22: YES), the setting unit 230 advances the process to step S23. On the other hand, when determining that the battery temperature TB is higher than the predetermined reference temperature at step S22 (S22: NO), the setting unit 230 advances the process to step S26.

In step S26, the setting unit 230 sets the state-of-charge lower limit SOCL to an initial value (specific value) of the first lower limit A. Thereafter, the setting unit 230 ends the current warm-up-time value setting control.

As described above, when determining that the battery temperature TB is lower than or equal to the predetermined reference temperature at step S22 (S22: YES), the setting unit 230 advances the process to step S23.

In step S23, the setting unit 230 corrects the first lower limit A on the basis of the battery temperature TB obtained in step S21. The corrected first lower limit A, which is calculated by the setting unit 230, is less than the initial value of the first lower limit A. Also, the corrected first lower limit A, which is calculated by the setting unit 230, decreases as the battery temperature TB decreases.

In step S24, the setting unit 230 sets the state-of-charge lower limit SOCL to the corrected first lower limit A. That is, the state-of-charge lower limit SOCL set in step S24 is less than the state-of-charge lower limit SOCL set in step S26. Thereafter, the setting unit 230 ends the current warm-up-time value setting control.

Figure 5:
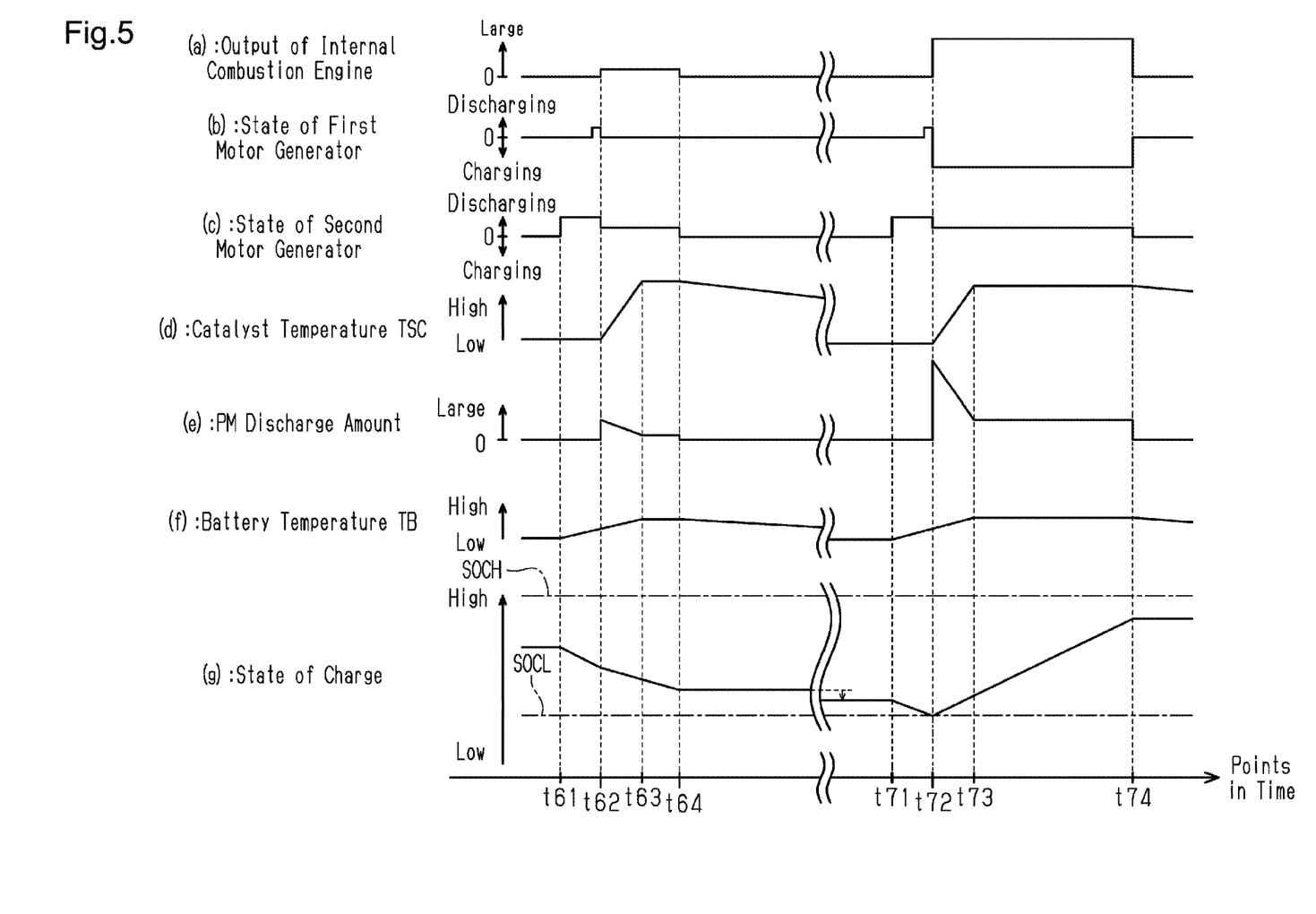
FIG. 5 is a timing diagram showing an operation of a comparative example.

A comparative example, which is compared with the present embodiment, will be now described with reference to FIG. 5. In the comparative example of FIG. 5, the state-of-charge lower limit SOCL is set to a constant value, which is, for example, 30%. In FIG. 5, a period from a point in time t61 to a point in time t64 represents an operation of the vehicle 100 in one specific trip, and a period from a point in time t71 to a point in time t74 represents an operation of the vehicle 100 in the subsequent trip.

When the EV mode is selected at the point in time t61, power is supplied to the second motor generator 72 from the battery 75 as indicated in the item (c), so that the second motor generator 72 functions as an electric motor. During the period from the point in time t61 to the point in time t64, the power continues to be supplied to the second motor generator 72 from the battery 75, so that the state of charge SOC of the battery 75 gradually decreases as indicated in the item (g).

When the HV mode is selected after the point in time t61, the crankshaft 12 is rotated by the first motor generator 71, so that the internal combustion engine 10 is started at the point in time t62 as indicated in the item (a). Then, after the point in time t62, the internal combustion engine 10 continues to operate in order to increase the temperature of the three-way catalyst 27, that is, in order to complete the warm-up of the internal combustion engine 10 as indicated in the item (d).

Since power is supplied to the second motor generator 72 from the battery 75 during the period from the point in time t61 to the point in time t64, the battery temperature TB at the point in time t64 is relatively high as indicated in the item (f). Also, since no power is supplied to or outputted from the battery 75 during the period from the point in time t64 to the point in time t71, the battery temperature TB gradually decreases after the point in time t64 as indicated in the item (f), so that the battery temperature TB at the point in time t71 is lower than the battery temperature TB at the point in time t 64. When the battery temperature TB decreases in this manner, the amount of power that the battery 75 can supply to the first and second motor generators 71, 72 is reduced. The calculated state of charge SOC decreases as the battery temperature TB decreases. That is, the state of charge SOC at the point in time t71 is less than the state of charge SOC at the point in time t64. The difference between the state of charge SOC and the state-of-charge lower limit SOCL at the point in time t71 is less than the difference between the state of charge SOC and the state-of-charge lower limit SOCL at the point in time t64. As a result, if the value of the state-of-charge lower limit SOCL is constant, the charging control is easier to execute at the point in time t71 than at the point in time t64.

When the EV mode is selected at the point in time t71, power is supplied to the second motor generator 72 from the battery 75 as indicated in the item (c), so that the second motor generator 72 functions as an electric motor. Then, during the period from the point in time t71 to the point in time t72, the power continues to be supplied to the second motor generator 72 from the battery 75, so that the state of charge SOC of the battery 75 gradually decreases as indicated in the item (g).

When the HV mode is selected after the point in time t71, the crankshaft 12 is rotated by the first motor generator 71, so that the internal combustion engine 10 is started at the point in time t72 as indicated in the item (a). Immediately after the point in time t72, the temperature of the cylinders 11 is low, so that fuel is unlikely to volatilize. Thus, the amount of particulate matter discharged from the cylinders 11 per unit time tends to be greater during the period from the point in time t72 to the point in time t73, which is the warm-up period of the internal combustion engine 10, than during the period from the point in time t73 to the point in time t74, which is a period after the warm-up period of the internal combustion engine 10 ends. Since the temperature of the cylinders 11 gradually increases due to combustion of air-fuel mixture in the cylinders 11 during the period from the point in time t72 to the point in time t73, the amount of particulate matter discharged from the cylinders 11 per unit time gradually decreases.

Further, when the state of charge SOC decreases to the state-of-charge lower limit SOCL at the point in time t72 as indicated in the item (g), the charging control is executed as indicated in the item (h), so that the battery 75 is charged with the power generated by the first motor generator 71 using the driving force of the internal combustion engine 10. At this time, the ratio of the output of the internal combustion engine 10 to the vehicle required output increases, and the ratio of the output of the second motor generator 72 decreases. Then, as indicated in the item (a), the output of the internal combustion engine 10 in a case in which the charging control is executed is greater than that in a case in which the charging control is not executed, so that the amount of fuel supplied into the cylinders 11 is increased. As indicated in the item (e), the amount of particulate matter discharged from the cylinders 11 per unit time increases particularly during the warm-up period from the point in time t72 to the point in time t73. In this case, the PM deposit amount PS of the filter 28 is likely to increase with the amount of particulate matter discharged from the cylinders 11. As a result, the filter 28 may be at least partially clogged with particulate matter during the warm-up period.

Figure 4:
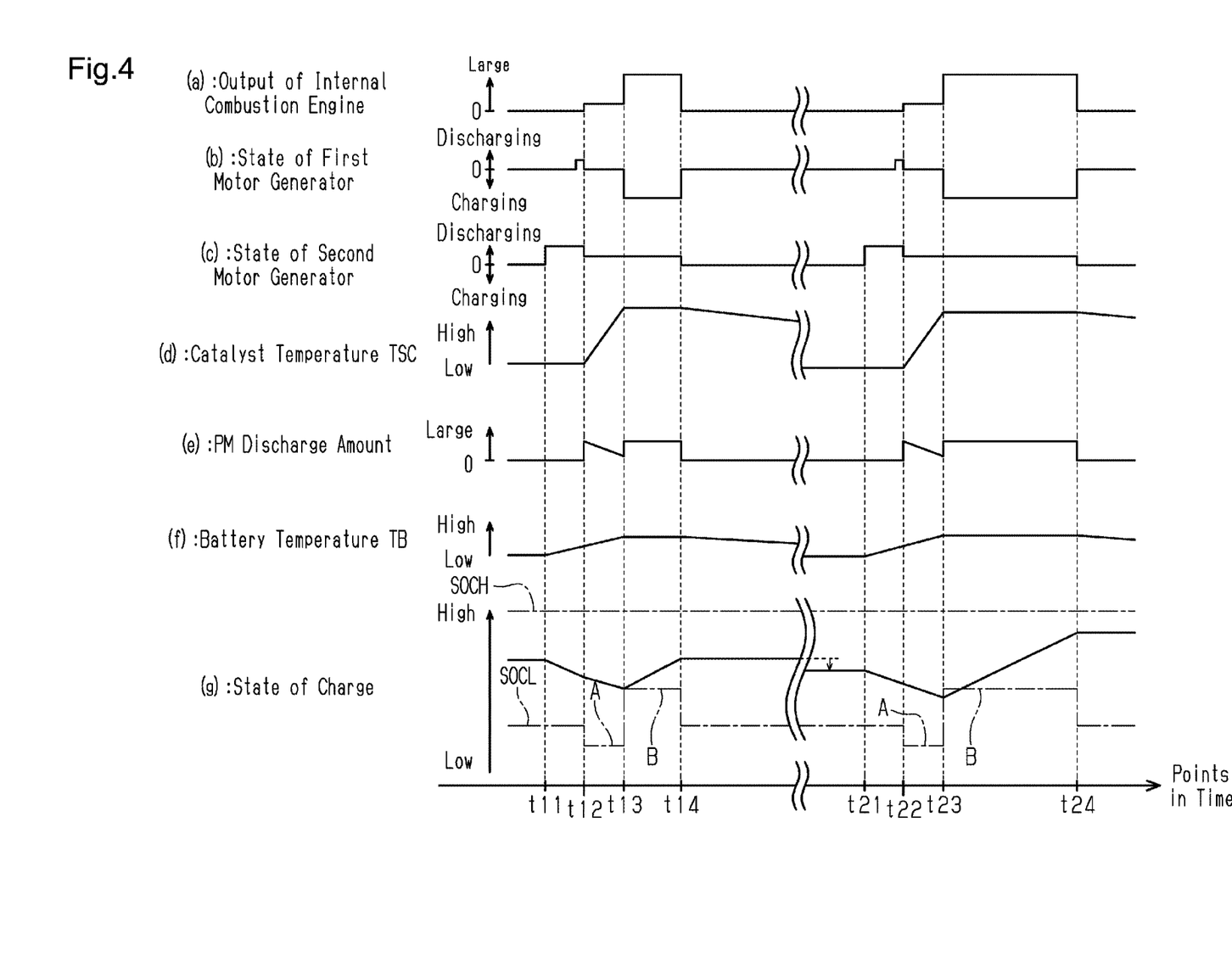
FIG. 4 is a timing diagram showing an operation of the embodiment.

An operation of the present embodiment will be now described with reference to FIG. 4. In FIG. 4, a period from a point in time t11 to a point in time t14 represents an operation of the vehicle 100 in one specific trip, and a period from a point in time t21 to a point in time t24 represents an operation of the vehicle 100 in the subsequent trip. The example shown in FIG. 4 assumes that the PM deposit amount PS has reached or exceeded the predetermined determination value.

When the EV mode is selected at the point in time t11, power is supplied to the second motor generator 72 from the battery 75 as indicated in the item (c), so that the second motor generator 72 functions as an electric motor. During the period from the point in time t11 to the point in time t13, the power continues to be supplied to the second motor generator 72 from the battery 75, so that the state of charge SOC of the battery 75 gradually decreases as indicated in the item (g).

When the HV mode is selected after the point in time t11, the crankshaft 12 is rotated by the first motor generator 71, so that the internal combustion engine 10 is started at the point in time t12 as indicated in the item (a). Then, after the point in time t12, the internal combustion engine 10 continues to operate in order to increase the temperature of the three-way catalyst 27, that is, in order to complete the warm-up as indicated in the item (d).

After the warm-up period of the internal combustion engine 10 ends, the state-of-charge lower limit SOCL is set to the second lower limit B, which is greater than the first lower limit A at a point in time t13, as indicated in the item (g). Then, the state of charge SOC is less than or equal to the second lower limit B during the period from the point in time t13 to the point in time t14, that is, during the period after the end of the warm-up period of the internal combustion engine 10, so that the charging control is executed as indicated in the item (b). In this manner, during the period after the end of the warm-up period of the internal combustion engine 10, the state of charge SOC is increased by increasing the state-of-charge lower limit SOCL as compared to a case in which the state-of-charge lower limit SOCL continues to be set to a constant value, for example, to the initial value of the first lower limit A.

Thereafter, when the battery temperature TB drops during the period from the point in time t14 to the point in time t21, the state of charge SOC at the point in time t21 is less than the state of charge SOC at the point in time t14 as indicated in the item (g). During the period from the point in time t21 to the point in time t22, power continues to be supplied to the second motor generator 72 from the battery 75, so that the state of charge SOC of the battery 75 decreases. That is, the state of charge SOC at the point in time t22 is even smaller than the state of charge SOC at the point in time t21. However, during the warm-up period from the point in time t22 to the point in time t23, the state-of-charge lower limit SOCL is set to the first lower limit A, which is less than the second lower limit B, which is used when the warm-up period ends. Thus, as indicated in the item (g), the difference between the state of charge SOC and the state-of-charge lower limit SOCL at the point in time t22 is greater than that in a case in which the state-of-charge lower limit SOCL is set to the second lower limit B. Accordingly, during the warm-up period from the point in time t22 to the point in time t23, the state of charge SOC is unlikely to become the state-of-charge lower limit SOCL, so that the charging control is unlikely to be executed.

The amount of power that the battery 75 can supply decreases as the battery temperature TB decreases. Thus, the calculated state of charge SOC decreases as the battery temperature TB decreases. That is, the lower the battery temperature TB at the point in time t21, the lower the state of charge SOC calculated at the point in time t21 becomes. If the state-of-charge lower limit SOCL is always set to the initial value of the second lower limit B during the period from the point in time t13 to the point in time t14, the state of charge SOC calculated at the point in time t21 becomes excessively low depending on the battery temperature TB at the point in time t21. In this case, even if the state of charge SOC exceeds the second lower limit B during the period from the point in time t13 to the point in time t14, the state of charge SOC may become less than or equal to the state-of-charge lower limit SOCL during the warm-up period from the point in time t22 to the point in time t23, so that the charging control is executed.

It is predicted that the battery temperature TB at the point in time t21 decreases as the battery temperature TB obtained by the obtaining unit 220 during the period from the point in time t11 to the point in time t14 decreases. Thus, in the present embodiment, the second lower limit B is corrected to be a large value in anticipation that the battery temperature TB at the point in time t21 decreases as the battery temperature TB obtained by the obtaining unit 220 during the period from the point in time t11 to the point in time t14 decreases. That is, the second lower limit B, which is used as the state-of-charge lower limit SOCL during the period from the point in time t13 to the point in time t14, is increased. Therefore, even if the state of charge SOC is reduced due to a decrease in the battery temperature TB at the point in time t21, the state of charge SOC calculated at the point in time t21 is high as compared to a case in which the state-of-charge lower limit SOCL is always set to the initial value of the second lower limit B (fixed value). Accordingly, the state of charge SOC during the warm-up period (from the point in time t22 to the point in time t23) also increases, so that the charging control is prevented from being executed during the warm-up period. This limits, during the warm-up period, an increase in the ratio of the output of the internal combustion engine 10 to the vehicle required output, which is necessary for the vehicle 100 to travel.

The present embodiment has the following advantages.

(1) The charging control is prevented from being executed during the warm-up period of the internal combustion engine 10. This limits an increase in the amount of particulate matter discharged from the cylinders 11 of the internal combustion engine 10 during the warm-up period of the internal combustion engine 10 as indicated in the item (e) of FIG. 4.

(2) It is predicted that, if the area and the time of day in which the vehicle 100 travels are the same, there will be no large difference between the battery temperature TB obtained in the current trip from the point in time t11 to the point in time t14 and the battery temperature TB during the warm-up period (from the point in time t22 to the point in time t23) in the subsequent trip. Thus, as indicated in the item (f) of FIG. 4, the lowest temperature of the battery temperature TB during the current trip (from the point in time t11 to the point in time t14) is highly likely to be lower than the battery temperature TB during the subsequent warm-up period (from the point in time t22 to the point in time t23). In this regard, the present embodiment corrects the second lower limit B on the basis of the lowest temperature of the battery temperature TB in the current trip, which is predicted to be lower than the battery temperature TB during the subsequent warm-up period. It is thus possible to increase the state of charge SOC of the battery 75 in expectation of a situation in which the amount of power that the battery 75 can supply will decrease.

(3) Depending on the point in time at which the internal combustion engine 10 is started, the battery temperature TB during the warm-up period (from the point in time t22 to the point in time t23) may be lower than the battery temperature TB for the trip from the point in time t11 to the point in time t14. In this case, even if the state of charge SOC of the battery 75 is increased by increasing the second lower limit B during the warm-up period (from the point in time t13 to the point in time t14) on the basis of the battery temperature TB for the trip from the point in time t11 to the point in time t14, the charging control may be executed during the warm-up period (from the point in time t22 to the point in time t23).

In this regard, the present embodiment sets the state-of-charge lower limit SOCL to the corrected first lower limit A, which is less than the initial value of the first lower limit A, if the current battery temperature TB is lower than or equal to the reference temperature during the warm-up period (from the point in time t22 to the point in time t23). That is, the state-of-charge lower limit SOCL is reduced in accordance with the battery temperature TB during the warm-up period (from the point in time t22 to the point in time t23). Accordingly, the state of charge SOC of the battery 75 does not become less than or equal to the state-of-charge lower limit SOCL during the warm-up period (from the point in time t22 to the point in time t23). This prevents the charging control from being executed.

(4) The normal-time value setting control is also capable of setting the state-of-charge lower limit SOCL to the corrected second lower limit B, which is greater than the initial value of the second lower limit B, regardless whether the PM deposit amount PS is greater than or equal to the predetermined determination value, that is, regardless whether the filter 28 is highly likely to be at least partially clogged with particulate matter. However, when the state-of-charge lower limit SOCL is set to the corrected second lower limit B, the charging control is likely to be executed frequently as compared to a case in which the state-of-charge lower limit SOCL is set to the initial value of the second lower limit B.

During the warm-up period of the internal combustion engine 10, the execution of the charging control increases the amount of particulate matter discharged from the cylinders 11 of the internal combustion engine 10 per unit time. Even in this case, the increased amount of particulate matter has a small influence if the PM deposit amount PS is small. In this regard, the present embodiment sets the state-of-charge lower limit SOCL to the initial value of the second lower limit B, which is less than the corrected second lower limit B, when the PM deposit amount PS is less than the predetermined determination value, that is, when the filter 28 is unlikely to be at least partially clogged with particulate matter. Accordingly, the charging control is not executed frequently in a situation in which the filter 28 is unlikely to be at least partially clogged with particulate matter.

The present embodiment may be modified as follows. The present embodiment and the following modifications can be combined as long as the combined modifications remain technically consistent with each other.

In the above-described embodiment, the normal-time value setting control may be changed. For example, the correction of the second lower limit B in step S13 can be changed. Specifically, the setting unit 230 may determine whether the battery temperature TB is lower than or equal to a predetermined determination temperature. When the battery temperature TB is lower than or equal to the predetermined determination temperature, the setting unit 230 may add a predetermined specific value to the initial value of the second lower limit B, and calculate the obtained value as the corrected second lower limit B.

For example, the process of step S12 may be omitted. In this case, it suffices if the setting unit 230 corrects the second lower limit B on the basis of the battery temperature TB regardless of the PM deposit amount PS. This configuration allows the process of step S16 to be omitted.

The process of obtaining the battery temperature TB in step S11 may be changed. As described above, the battery temperature TB has a tendency to increase when receiving power from the battery 75 or when charging the battery 75 with power. Thus, the battery temperature TB that is obtained first is likely to be the lowest among the battery temperatures TB obtained by the obtaining unit 220 in a single trip. Therefore, in step S11, the setting unit 230 may obtain the battery temperature TB that among the battery temperatures TB obtained in a single trip. In this configuration, the obtaining unit 220 simply needs to store the battery temperature TB that is obtained first among the battery temperatures TB obtained in the single trip.

In the above-described embodiment, the warm-up-time value setting control may be changed. For example, the correction of the first lower limit A in step S23 may be changed. Specifically, the setting unit 230 may subtract a predetermined specific value from the initial value of the first lower limit A, and calculate the obtained value as the corrected first lower limit A.

For example, the reference temperature in step S22 may be changed.

Further, the process of step S22 may be omitted. In this case, the setting unit 230 simply needs to correct the first lower limit A on the basis of the battery temperature TB. Also, the setting unit 230 simply needs to always set the state-of-charge lower limit SOCL to the corrected first lower limit A. This configuration allows the process of step S26 to be omitted.

In the above-described embodiment, the warm-up-time value setting control may be omitted. Even in this case, the charging control is prevented from being executed during the subsequent warm period of the internal combustion engine 10 if the state of charge SOC is increased by the normal-time value setting control.

In the above-described embodiment, the vehicle does not necessarily need to include two motor generators, but may only include at least one motor generator. Such a vehicle simply needs to have a configuration in which the at least one motor generator can generate power by using the driving force of an internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle, the vehicle including an internal combustion engine, a motor generator, and a battery that is configured to store power that is generated by the motor generator using a driving force of the internal combustion engine, the controller comprising:
   circuitry configured to execute, when a state of charge of the battery is less than or equal to a threshold, a charging control to charge the battery with the power that is generated by the motor generator using the driving force of the internal combustion engine, the circuitry being configured to
   obtain a temperature of the battery,
   set the threshold to a first threshold during a warm-up period, the warm-up period being a period from a start of the internal combustion engine until the warm-up of the internal combustion engine is completed,
   set the threshold to a second threshold when the warm-up period ends, the second threshold being greater than the first threshold, and
   set the second threshold to be greater when the temperature of the battery is a first temperature than when the temperature of the battery is a second temperature, the second temperature being higher than the first temperature,
   wherein the circuitry is further configured to set the second threshold on a basis of a lowest temperature of the battery among temperatures obtained during a current trip.

2. The controller for a vehicle according to claim 1, wherein the circuitry is configured to set the first threshold to be less when the temperature of the battery is a third temperature than when the temperature of the battery is a fourth temperature, the fourth temperature being higher than the third temperature.

3. The controller for a vehicle according to claim 1, wherein
   the vehicle includes a filter that traps particulate matter that is in an exhaust gas of the internal combustion engine,
   the circuitry is configured to
   set the second threshold on a basis of the obtained temperature of the battery when a particulate matter (PM) deposit amount is greater than or equal to a determination value, the PM deposit amount being an amount of particulate matter deposited on the filter, and
   set the second threshold to an initial value when the PM deposit amount is less than the determination value, and
   the initial value is less than the second threshold that is set when the PM deposit amount is greater than or equal to the determination value.

4. A control method for a vehicle, the vehicle including an internal combustion engine, a motor generator, and a battery that is configured to store power that is generated by the motor generator using a driving force of the internal combustion engine, the control method comprising:
   executing, when a state of charge of the battery is less than or equal to a threshold, a charging control to charge the battery with the power that is generated by the motor generator using the driving force of the internal combustion engine;
   obtaining a temperature of the battery;
   setting the threshold to a first threshold during a warm-up period, the warm-up period being a period from a start of the internal combustion engine until the warm-up of the internal combustion engine is completed;
   setting the threshold to a second threshold when the warm-up period ends, the second threshold being greater than the first threshold;
   setting the second threshold to be greater when the temperature of the battery is a first temperature than when the temperature of the battery is a second temperature, the second temperature being higher than the first temperature; and
   setting the second threshold on a basis of a lowest temperature of the battery among temperatures obtained during a current trip.

* * * * *